(12) United States Patent
Aharonov et al.

(10) Patent No.: US 8,838,984 B2
(45) Date of Patent: Sep. 16, 2014

(54) OPTIMIZED HIERARCHICAL INTEGRITY PROTECTION FOR STORED DATA

(75) Inventors: Arseniy Aharonov, Arad (IL); Yonatan Halevi, Petah Tikva (IL)

(73) Assignee: SanDisk IL Ltd., Kfar Saba (IL)

( * ) Notice: Subject to any disclaimer, the term of this patent is extended or adjusted under 35 U.S.C. 154(b) by 653 days.

(21) Appl. No.: 12/236,969

(22) Filed: Sep. 24, 2008

(65) Prior Publication Data

US 2009/0113219 A1 Apr. 30, 2009

(30) Foreign Application Priority Data

Oct. 30, 2007 (IL) .......................................... 187041

(51) Int. Cl.
*H04L 9/32* (2006.01)
*G06F 21/64* (2013.01)

(52) U.S. Cl.
CPC ..................................... *G06F 21/64* (2013.01)
USPC ........................................................ 713/177

(58) Field of Classification Search
CPC ........................................................ H04L 9/00
USPC ........................................................ 713/177
See application file for complete search history.

(56) References Cited

U.S. PATENT DOCUMENTS

| | | | |
|---|---|---|---|
| 4,881,264 A | 11/1989 | Merkle | |
| 5,638,447 A | 6/1997 | Micali | |
| 6,226,743 B1 | 5/2001 | Naor et al. | |
| 6,467,021 B1 * | 10/2002 | Sinclair | 711/113 |
| 6,701,434 B1 | 3/2004 | Rohatgi | |
| 6,757,322 B2 | 6/2004 | Schilling | |
| 6,795,915 B2 * | 9/2004 | Wang | 713/2 |
| 6,915,175 B2 * | 7/2005 | Ahn | 700/87 |
| 6,948,066 B2 * | 9/2005 | Hind et al. | 713/168 |
| 7,315,866 B2 * | 1/2008 | Wu et al. | 1/1 |
| 7,330,980 B2 * | 2/2008 | Nasu | 713/193 |
| 7,340,580 B2 * | 3/2008 | Kinoshita | 711/173 |
| 2002/0194484 A1 | 12/2002 | Bolosky et al. | |
| 2005/0021905 A1 | 1/2005 | Kwon | |
| 2005/0234847 A1 * | 10/2005 | Damien et al. | 707/1 |
| 2006/0107047 A1 | 5/2006 | Bar-El | |
| 2007/0005935 A1 * | 1/2007 | Khosravi et al. | 711/216 |

FOREIGN PATENT DOCUMENTS

WO WO-2006051522 5/2006

OTHER PUBLICATIONS

Schneier, Bruce. Applied Cryptography. 1996. pp. 436-437, Section: 18.5.*

* cited by examiner

*Primary Examiner* — Dant Shaifer Harriman
(74) *Attorney, Agent, or Firm* — Brinks Gilson & Lione

(57) ABSTRACT

A method for data integrity protection includes receiving items of data for storage in a storage medium. The items are grouped into multiple groups, such that at least some of the groups include respective pluralities of the items. A respective group signature is computed over each of the groups, thereby generating multiple group signatures. An upper-level signature is computed over the group signatures. Groups of the items, the group signatures, and the upper-level signature are stored in respective locations in the storage medium.

19 Claims, 3 Drawing Sheets

OPTIMIZED HIERARCHICAL INTEGRITY PROTECTION FOR STORED DATA

FIELD OF THE INVENTION

The present invention relates generally to data storage systems, and specifically to methods and systems for maintaining the integrity of stored data.

BACKGROUND OF THE INVENTION

Structural integrity schemes are used in data storage applications to protect data from being modified without authorization. Such schemes typically use a structure comprising one or more levels of signatures to protect data integrity.

SUMMARY OF THE INVENTION

Various embodiments of a system and method for data integrity protection are possible. An embodiment of a method for data integrity protection may include receiving items of data for storage in a storage medium and grouping the items into multiple groups, such that at least some of the groups include respective pluralities of the items. A respective group signature is computed over each of the groups, thereby generating multiple group signatures, and an upper-level signature is computed over the group signatures. The groups of the items, the group signatures and the upper-level signature are stored in respective locations in the storage medium.

In disclosed embodiments, the storage medium may be configured to be accessed in access units of a predefined size, and grouping the items may include selecting the items to be included in each group responsively to the predefined size. Typically, storing the groups of the items may include aligning the groups with respective access units of the storage medium so that each group occupies an identical number of the access units. In one embodiment, the medium may include a non-volatile electronic memory, and the access units are pages. Storing the group signatures may include grouping the multiple signatures into two or more signature groups responsively to the predefined size, and aligning each of the signature groups with the access units in a respective location in the storage medium.

In some embodiments, computing the upper-level signature may include grouping the group signatures into signature groups for storage in the storage medium, computing respective super-signatures over the signature groups, and calculating the upper-level signature over the super-signatures. Typically, calculating the upper-level signature may include grouping the super-signatures into two or more super-groups, computing respective upper-level signatures over the super-signatures in the two or more super-groups, and the method may include arranging the groups of the items and the super-groups in first and second levels, respectively, of a hierarchy, which may include at least three levels and culminates in a top level containing a top-level signature computed over the hierarchy.

The items of data may be cryptographic secrets.

Another embodiment may provide apparatus for data integrity protection, including a storage medium for storing items of data, and a storage controller, which may be configured to group the items into multiple groups, such that at least some of the groups include respective pluralities of the items. The storage controller may be configured to compute a respective group signature over each of the groups, thereby generating multiple group signatures, to compute an upper-level signature over the group signatures, and to store the groups of the items, the group signatures and the upper-level signature in respective locations in the storage medium.

An additional embodiment may provide a software product, including a machine-readable medium in which program instructions are stored, which instructions, when read by a programmable controller that is coupled to store items of data in a storage medium, may cause the controller to group the items into multiple groups, such that at least some of the groups comprise respective pluralities of the items, to compute a respective group signature over each of the groups, thereby generating multiple group signatures, to compute an upper-level signature over the group signatures, and to store the groups of the items, the group signatures and the upper-level signature in respective locations in the storage medium.

The present invention will be more fully understood from the following detailed description of the embodiments thereof, taken together with the drawings in which:

DETAILED DESCRIPTION OF EMBODIMENTS

Overview

Figure 1:
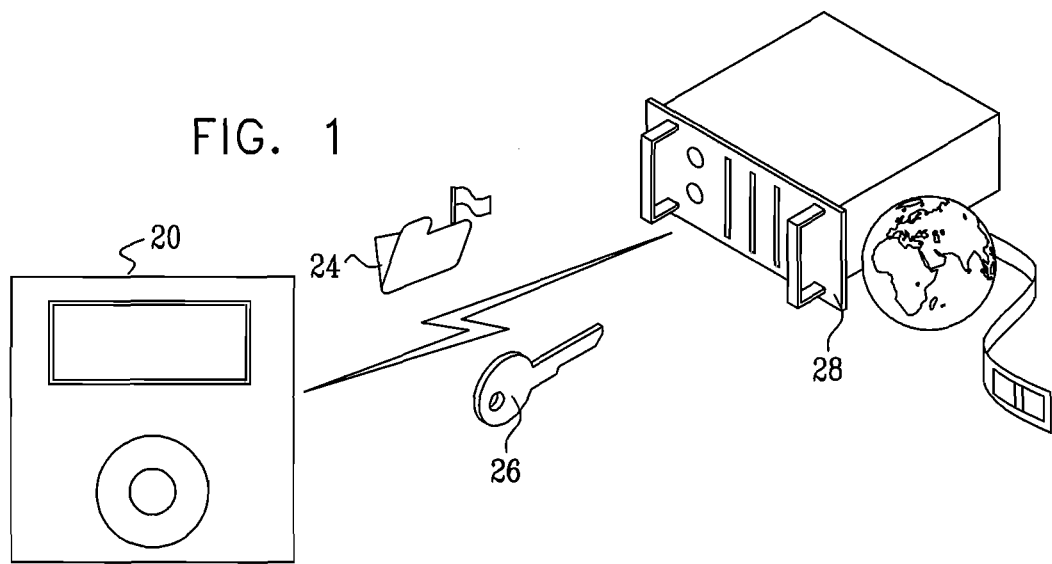
FIG. 1 is a schematic, pictorial illustration of a device for storing data using a hierarchical integrity scheme, in accordance with an embodiment of the present invention.

Secure data storage systems often use signatures to provide integrity protection. In the context of the present patent application and in the claims, the term "signature" is used broadly to refer to any code that is calculated over an element of data and may subsequently be used to verify that the data element has not changed since the code was calculated. There are many types of signatures utilized in secure data storage systems. These include, but are not limited to—MAC, hash, CRC, PGP, and PKI:

- A cryptographic message authentication code (MAC) is a short piece of information used to authenticate a message.
- A cryptographic hash function is a transformation that takes an input and returns a fixed-size string, which is called the hash value.
- A cyclic redundancy check (CRC) is a type of function that takes as input a data stream of any length and produces as output a value of a certain fixed size.
- Pretty Good Privacy (PGP) encryption uses public-key cryptography and includes a system which binds public keys to a user name.
- A public key infrastructure (PKI) is an arrangement that binds public keys with respective user identities by means of a certificate authority.

In some hierarchical data integrity schemes, a digital signature is created for each data item being stored and is updated when any data is added or changed. An upper-level signature is computed over the signatures of the data items to protect the integrity of the signatures, and the upper-level signatures may themselves be protected by one or more levels of super-signatures, in a hierarchical manner, up to the top-level signature, which verifies the integrity of the entire data structure.

This type of secure data storage architecture has a number of drawbacks, especially when utilized in devices that use embedded or flash memory:

1. When the data items are small in size, storing the signatures themselves can occupy a significant percentage of the storage space, as high as half the available capacity.
2. As every data item has its own signature, the time to calculate the top-level signature grows with the addition of each new data item. In a secure data storage system, this calculation must be performed every time data is read from memory. A change in the calculation time can be a security risk in the case of timing attacks. (A timing attack is an attempt by an unauthorized entity to compromise a secure data system by analyzing the time taken to execute cryptographic algorithms.)
3. The calculation of the top-level signature, which is dependent upon the values of all of the signatures below it in the data structure, can take a significant amount of processing time.
4. If data items are allowed to span multiple storage units, the storage system will take longer to access data items that are spread across more than one unit of storage than data items that are contained within a single unit. This variation in access time may also be used in timing attacks.

Embodiments of the present invention provide methods for enhancing the efficiency and security of data storage systems that use hierarchical integrity schemes. Data items for storage are grouped together, and a group signature is calculated for each group, rather than each data item. Typically, the data items are grouped so that all groups are similar in size and are aligned with respective access units of the storage medium so that each group occupies an identical number of the access units. The signatures may be grouped in like manner. In this scheme, the number of signature levels may be defined statically.

Grouping data items for signature in a hierarchical integrity data structure requires a smaller amount of storage space than signing each data item individually. Furthermore, aligning the groups with equal numbers of access units reduces the security risk for timing attacks, as does the static definition of the number of signature levels, which provides a fixed-length path for calculating the top-level signature. The static number of signature levels and the use of signature grouping together simplify and speed up the top-level signature calculation, leading to better performance when reading and writing data to the secure data store.

System Description

FIG. 1 is a schematic, pictorial illustration of a media player device 20 that uses a hierarchical integrity scheme for secure data storage, in accordance with an embodiment of the present invention. Device 20 downloads an encrypted media file 24 from a media server 28 or other source. In order to decrypt and play the media file, device 20 must also download an associated cryptographic secret, in the form of a secret key 26, from server 28. Key 26 itself is typically downloaded to device 20 in a form that is inaccessible to the user of the device. Therefore, the user is unable to change, duplicate, or make any other unauthorized use of the key. Optionally, for enhanced security, the keys themselves may be stored in the device in encrypted form.

Media file 24 and key 26 are stored in memory in device 20. Typically, device 20 stores many different media files, each with its own unique key. In order to prevent unauthorized access to and use of the keys (and hence of the media files), the keys are arranged in a secure hierarchical integrity structure in the memory of device 20. This structure, as described in detail below with reference to FIG. 3, contains the keys along with multiple levels of signatures. When the user of device 20 attempts to access a given media file, the device checks the signatures that apply to the key for the file in order to verify that the key is authentic and has not been tampered with or copied illegally. After verifying the key in this manner, the device uses the key to decrypt and play the media file.

Although the embodiment shown in FIG. 1 presents one application of the present invention, this application is presented for the purpose of illustration only. The principles of the present invention may be used in any system that requires data integrity and is amenable to a hierarchical integrity scheme. The data secured by the hierarchical integrity scheme may comprise cryptographic secrets, as in the present example, or any other type of sensitive data.

Figure 2:
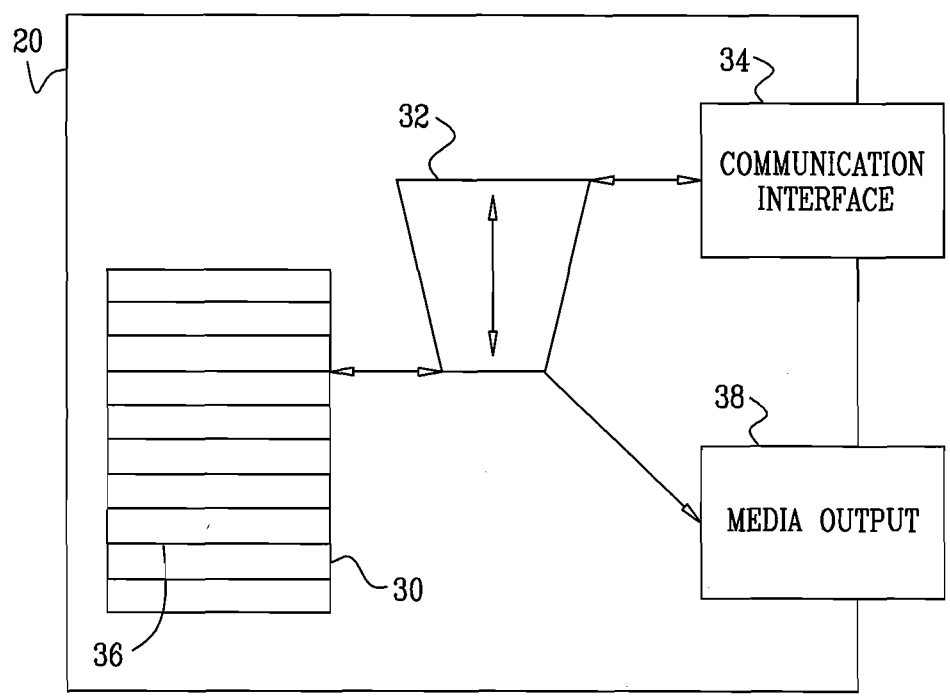
FIG. 2 is a block diagram that schematically illustrates internal details of the device of FIG. 1, in accordance with an embodiment of the present invention.

FIG. 2 is a block diagram that schematically illustrates internal details of device 20, in accordance with an embodiment of the present invention. An interface 34 passes data from an external source to a storage controller 32. As explained above, the data may include both media files and associated secret keys. Storage controller 32 stores the data in a storage medium, such as a flash memory 30. Flash memory is non-volatile, which means that it does not need power to maintain the information stored in the memory. Memory 30 is divided into access units, i.e., groups of memory cells that are written to and read from in a single write or read operation. In flash memory, the access unit is a page 36, which typically comprises between 512 and 2048 Kb.

Controller 32 is typically a programmable processing device, which operates under the control of program instructions that are stored in a machine-readable medium, such as flash memory 30 or other electronic memory, or in magnetic or optical media. The instructions cause the controller to perform the data integrity-related functions that are described herein. Alternatively or additionally, some or all of the functions of the controller may be performed by dedicated processing logic.

Typically, controller 32 stores the media files and secret keys in different, respective locations in memory 30. The keys are typically small items of data, each occupying considerably less than a full page 36. Therefore, the controller groups certain keys together on the basis of the page size, so that each group of keys fits into the same number of pages. For efficient access, it is advantageous that each group fills a single page, but larger groups may alternatively be used. In some cases, device 20 may receive keys of different sizes, including large keys that require an entire page or even multiple pages for storage. In such cases, each of these large keys may be a group unto itself, while smaller keys are grouped together. It may be advantageous, for resistance against timing attacks, to group the small keys so that each group occupies the same number of pages as one of the large keys.

Controller 32 computes a group signature over each group of keys, as well as upper-level signatures, to form a hierarchical integrity structure as shown below in FIG. 3. This structure is stored in memory 30. When the user of device 20 asks to play a particular media file, the controller reads the page containing the key from the memory and checks the block signature and upper-level signatures against the signature values that are stored in the memory. If the signature values match, the controller uses the key 26 to decrypt the media file and transfers the decrypted file to a media output 38, such as an audio speaker, for playback. If the signature values do not match, the controller determines that the integrity of the signature has been corrupted and returns a failure message. Although the present embodiment is described with reference to flash memory, the same principles apply to other types of storage media, including magnetic and optical, as well as electronic, memory:

Magnetic storage refers to the storage of data on a magnetized medium, such as a magnetic hard disk. Magnetic storage uses different patterns of magnetization in a magnetizable material to store data and is another form of non-volatile memory.

One form of optical storage uses tiny pits etched on the surface of a circular disc to store information. This information is read by illuminating the surface with a laser diode and observing the reflection. Optical disc storage is a form of non-volatile memory.

One form of electronic memory is random access memory (RAM). It loses the stored information when not electrically powered and is a form of volatile memory. Other types of programmable electronic memory are non-volatile, like flash memory.

Each of these types of storage media is characterized by access units of a particular size, such as blocks or tracks on a disk.

Hierarchical Integrity Mechanism

Figure 3:
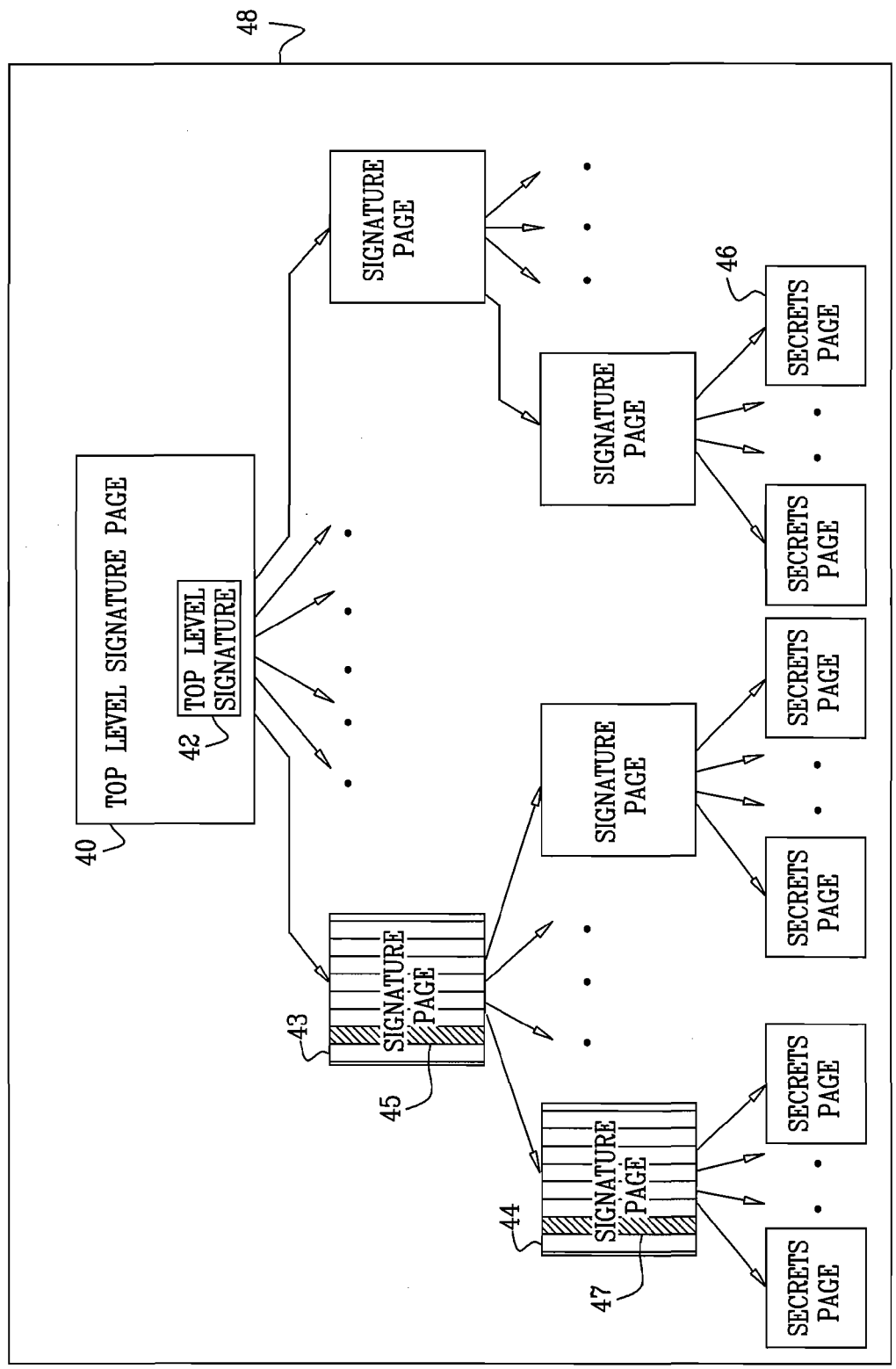
FIG. 3 is a diagram that schematically illustrates a data structure used to store data with hierarchical integrity, in accordance with an embodiment of the present invention.

FIG. 3 is a diagram that schematically illustrates a data structure 48 used by controller 32 to store data in memory 30 with hierarchical integrity, in accordance with an embodiment of the present invention. As explained above, cryptographic secrets (such as key 26) are divided into relatively small groups. The size of a group is aligned to a multiple of the access unit of the storage medium, such as one page 36. Each such aligned group of secrets is thus defined as a secrets page 46 in data structure 48.

Each page 46 of secrets is signed by controller 32 with a single group signature 47. The controller may compute the signatures using any suitable method known in the art, such as the MAC, hash, CRC, PGP, or PKI types of computations mentioned above. These group signatures constitute the lowest signature-level in structure 48. The group signatures themselves are also grouped into signature groups, and each group of signatures is stored by the controller in a respective signature page 44.

Each signature page 44 is itself protected by a super-signature 45 computed by the controller over the group signatures in the signature page. Signature pages 44 are grouped together into super-groups, and the super-signatures of the signature pages in each super-group are recorded on an upper-level signature page 43, which constitutes the next signature level in the integrity hierarchy. The controller typically computes and stores the signatures of all the signature levels in the same way that it treats the secrets themselves. Thus, the controller may advantageously group signature pages 44 into super-groups so that the super-signatures in each upper-level signature page 43 are likewise aligned with an access unit of memory 30.

The integrity hierarchy converges to a top-level signature page 40, which typically contains the upper-level signatures of upper-level signature pages 43. The controller computes a top-level signature 42 over the upper-level signatures of all of pages 43, and thus protects the integrity of the whole data structure, including the secrets and the signatures. For protection against re-flash attacks, the controller may include the value of a counter, which is incremented on each update (in addition to the upper-level signatures of blocks 43) in calculation of the top-level signature. Although the hierarchy in structure 48 is shown, by way of example, as comprising three levels of signature pages 44, 43 and 40, the principles of the present invention may be applied in hierarchies having any practical number of levels of signature pages, two or greater.

Figure 4:
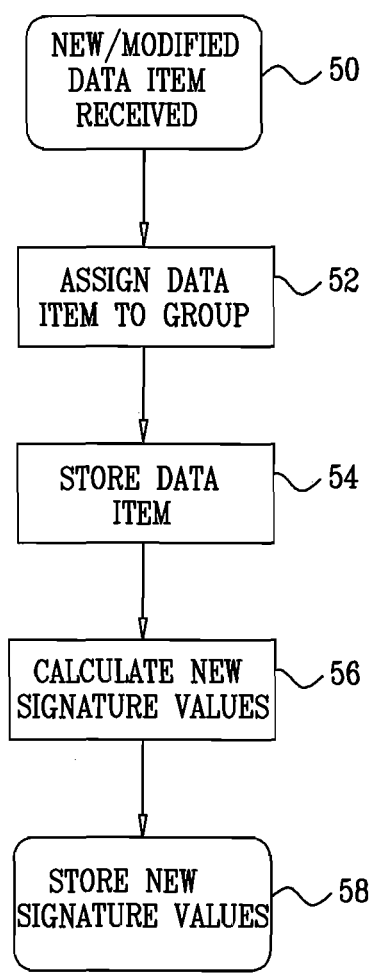
FIG. 4 is a flow chart that schematically illustrates a method for storing received data, in accordance with an embodiment of the present invention.

FIG. 4 is a flow chart that schematically illustrates a method for managing hierarchical integrity data structure 48, in accordance with an embodiment of the present invention. The process begins at an initial step 50, whenever controller 32 (FIG. 2) receives a new or modified data item (such as key 26) for secure storage in memory 30. Controller 32 assigns the data item to a group based upon its size and the access unit size of the memory, at an assignment step 52. For efficient storage, it is desirable that each group contain enough data items to fill most of the access unit (or the number of access units) assigned to it.

Controller 32 stores the data item, together with the other data items in its assigned group, on the appropriate secrets page 46 (FIG. 3), at a storage step 54. The controller then computes the new value of group signature 47 and the appropriate higher-level signatures in hierarchy 48, at a signature calculation step 56. The controller computes the signatures iteratively up through the hierarchy from the secrets page that has been changed up to top-level signature 42. Thus, for example, assuming a new data item has been written to the leftmost secrets page 46 in the hierarchy, the controller performs the following computations:

Compute an updated value of group signature 47 over all of the signatures in the given secrets page 46.

Compute an updated value of super-signature 45 of the leftmost signature page 44 over the updated value of group signature 47 together with the previously-computed values of the other group signatures in page 44.

Compute a new upper-level signature value over the updated value of super-signature 45 together with the previously-computed values of the other super-signatures in the leftmost upper-level page 43.

Compute a new top-level signature over this upper-level signature together with the previously-computed values of the upper-level signatures of the other super-groups. As noted above, the top-level signature may also include a counter value for protection against re-flash attacks.

Controller 32 stores the updated signature values in the appropriate pages of data structure 48, at a signature storage step 58. The controller performs the same number of computations and storage operations regardless of which data item or items are modified. Therefore, the time required by the controller to record a data item in hierarchy 48 is constant, thus providing protection against timing attacks.

To verify the integrity of a data item that is stored in a given page 46 of data structure 48, controller 32 reads the data from the page, and computes a new value of the group signature over that data. The controller compares this value to the group signature value that is stored in signature page 44. If the values do not match, the controller may conclude that the data integrity has been compromised and take appropriate action. The controller typically recomputes and compares the appropriate signature values iteratively, upward through the hierarchy to the top-level signature, in a manner analogous to the process described above for recording new data. If all of the signatures match their stored values, the controller verifies that the integrity of the data structure is intact and reads out the data item. In the case of media player device 20 (FIG. 1), for example, the controller may use the data item (key 26) to decrypt and play the corresponding media file 24.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting an integrity of data stored in a storage medium comprising a controller, the storage medium configured to be accessed in access units, wherein an access unit is a page of memory of the storage medium that may be written to or read from in a single write or read operation, the method comprising:
   receiving, with the controller, data items from a host device for storage in the storage medium;
   grouping, with the controller, based on a size of an access unit of the storage medium, the data items into a plurality of groups of the same size, wherein:
      at least some of the groups of the plurality of groups comprise a pluralities of the data items;
      the plurality of groups are aligned with access units of the storage medium; and
      each group of the plurality of groups occupies an identical number of pages of memory in the storage medium;
   computing, with the controller, a group signature over each group of the plurality of groups, thereby generating multiple group signatures;
   computing, with the controller, an upper-level signature over the multiple group signatures; and
   storing, with the controller, the plurality of groups of data items, the group signatures, and the upper-level signature in locations in the storage medium, wherein the number of signature levels is statically defined.

2. The method according to claim 1, wherein grouping the data items into the plurality of groups comprises:
   selecting the data items to be included in each group based on a size of the page of memory.

3. The method according to claim 2, wherein storing the group signatures comprises:
   grouping the multiple signatures into two or more signature groups based on the size of the page of memory; and
   aligning each of the signature groups with the access units in a location in the storage medium.

4. The method according to claim 1, wherein computing the upper-level signature comprises:
   grouping the group signatures into signature groups for storage in the storage medium;
   computing super-signatures over the signature groups; and
   calculating the upper-level signature over the super-signatures.

5. The method according to claim 4, wherein calculating the upper-level signature comprises grouping the super-signatures into two or more super-groups and computing upper-level signatures over the super-signatures in the two or more super-groups, and
   wherein the method further comprises arranging the groups of the data items and the super-groups into first and second levels, respectively, of a hierarchy, which comprises at least three levels and culminates in a top level containing a top-level signature computed over the hierarchy according to the number of statically-defined signature levels.

6. The method according to claim 1, wherein the data items are cryptographic secrets.

7. The method of claim 1, wherein the storage medium comprises flash memory.

8. The method of claim 1, wherein at least two of the data items received from the store device for storage in the storage medium are not the same size.

9. The method of claim 1, wherein the data items received from the host device for storage in the storage medium comprise a media file and a key associated with the media file; and wherein the media file and the key are grouped in different groups.

10. A storage system configured to be accessed in access units, wherein an access unit is a page of non-volatile memory of the storage system that may be written to or read from in a single write or read operation, the storage system comprising:
    a non-volatile memory; and
    a processor in communication with the non-volatile memory, the controller configured to:
       receive data items from a host device for storage in the non-volatile memory;
       group, based on a size of an access unit of the storage system, the data items into a plurality of groups of the same size, wherein the controller groups the data items into the plurality of groups so that:
          at least one group of the plurality of groups comprises a plurality of the data items;
          the plurality of groups are aligned with access units of the storage system; and
          each group of the plurality of groups occupies an identical number of pages of non-volatile memory in the storage system;
       compute a group signature over each group of the plurality of similarly-sized groups, thereby generating multiple group signatures;
       compute an upper-level signature over the multiple group signatures; and
       store in the non-volatile memory the plurality of groups of data items, the group signatures, and the upper-level signature, wherein the number of signature levels is statically defined.

11. The storage system of claim 10, wherein to group the data items into the plurality of groups, the processor is configured to select the data items to be included in each group based on a size of the page of memory.

12. The storage system of claim 11, wherein to store the group signatures, the processor is further configured to:
    group the multiple signatures into one or more signatures groups based on the size of the page of memory; and
    align each of the signature groups with the access units in a location in the non-volatile memory.

13. The storage system of claim 11, wherein to compute the upper-level signature, the processor is configured to:
    group the group signatures into signature groups for storage in the non-volatile memory;
    compute super-signatures over the signature groups; and
    calculate the upper-level signature over the super-signatures.

14. The storage system of claim 13, wherein to calculate the upper-level signature, the processor is configured to:
    group the super-signatures into two or more super groups; and
    compute upper-level signatures over the super-signatures in the two or more super groups.

15. The storage system of claim 14, wherein the processor is further configured to arrange the groups of the data items and the super-groups into first and second levels, respectively, of a hierarchy, which comprises at least three level and culminates in a top level containing a top-level signatures computed over the hierarchy based on the number of statically-defined signature levels.

16. The storage system of claim 10, wherein the data items are cryptographic secrets.

17. The storage system of claim 10, wherein the non-volatile memory comprises flash memory.

18. The storage system of claim 10, wherein at least two of the data items received from the storage device for storage in the non-volatile memory at not the same size.

19. The storage system of claim 10, wherein the data items received from the host device for storage in the non-volatile memory comprise a media file and a key associated with the media file; and wherein the media file and the key are grouped in different groups.

* * * * *